(12) United States Patent
Gaul et al.

(10) Patent No.: US 8,779,720 B2
(45) Date of Patent: Jul. 15, 2014

(54) CHARGING STATION FOR ELECTRIC VEHICLES WITH NETWORK STABILIZATION

(75) Inventors: Armin Gaul, Selm (DE); Ingo Diefenbach, Unna (DE)

(73) Assignee: RWE AG, Essen (DE)

( * ) Notice: Subject to any disclaimer, the term of this patent is extended or adjusted under 35 U.S.C. 154(b) by 381 days.

(21) Appl. No.: 13/362,518

(22) Filed: Jan. 31, 2012

(65) Prior Publication Data

US 2012/0161704 A1  Jun. 28, 2012

Related U.S. Application Data

(63) Continuation of application No. PCT/EP2010/058929, filed on Jun. 23, 2010.

(30) Foreign Application Priority Data

Aug. 10, 2009  (DE) .......................... 10 2009 050 042

(51) Int. Cl.
*H02J 7/00* (2006.01)

(52) U.S. Cl.
USPC .......................... 320/109; 320/104; 320/155

(58) Field of Classification Search
CPC ...... H02J 3/24; H02J 7/0027; Y02T 10/7005; Y02T 10/7088; B60L 11/1838
USPC .......................... 320/104, 107, 109, 134, 155
See application file for complete search history.

(56) References Cited

U.S. PATENT DOCUMENTS 8,013,570 B2 * 9/2011 Baxter et al. .................. 320/109

FOREIGN PATENT DOCUMENTS

| EP | 2 200 149 A2 | 6/2010 |
| JP | 2008-141926 A | 6/2008 |
| WO | WO 2008/135043 A2 | 11/2008 |

OTHER PUBLICATIONS

Alec Brooks; Smarter Charging; date last visited Feb. 9, 2012, but known to Applicant prior to filing application; 33 pages printed from internet; http://www.teslamotors.com/blog/smarter-charging.
J. A. Pecas Lopes et al.; Using Vehicle-to-Grid to Maximize the Integration of Intermittent Renewable Energy Resources in Islanded Electric Grids; 2009 International Conference on Clean Electrical Power (ICCEP 2009), Capri, Italy; Jun. 9-11, 2009; 12 pages.
David Hawkins; Integration of Energy Storage Technology White Paper—Identification of Issues and Proposed Solutions; May 22, 2008; 9 pages.
Dr. Ingo Diefenbach; Der mobile Kunde—Elektrofahrzeuge als neue Herausforderung für Netze; Apr. 23, 2009; 36 pages (pp. 27 and 28 do not exist); http//www.life-needs-power.de/2009/23-01-2009__15-30_Vortrag%20Diefenbach.pdf.
Patrick Ponticel; SAE Nears Completion of Standard for Charging Connector; Apr. 20, 2009; 2 pages; http://www.sae.org/mags/AEI/6216.

* cited by examiner

*Primary Examiner* — Edward Tso
*Assistant Examiner* — Aaron Piggush
(74) *Attorney, Agent, or Firm* — Reinhart Boerner Van Deuren P.C.

(57) ABSTRACT

Charging station for electric vehicles. A network stabilization is achieved by a network frequency measuring device 8 being arranged to acquire a network frequency and to detect a network frequency which deviates from a reference frequency, and a load regulating device 10 being in operational connection with the network frequency device 8 such that, upon a deviation from the reference frequency being detected in the network frequency, the load regulating device 10 regulates the electrical power emitted to an electric vehicle by the charging station 2.

9 Claims, 3 Drawing Sheets

CHARGING STATION FOR ELECTRIC VEHICLES WITH NETWORK STABILIZATION

CROSS-REFERENCE TO RELATED PATENT APPLICATIONS

This patent application is a continuation of International Application No. PCT/EP2010/058929 filed on Jun. 23, 2010, which claims the benefit of German application No. 10 2009 050042.1 filed on Aug. 10, 2009, the teachings and disclosure of which are hereby incorporated in their entirety by reference thereto.

FIELD OF THE INVENTION

The subject-matter relates to a charging station for electric vehicles with network stabilisation, and a method for operating a charging station for electric vehicles.

BACKGROUND OF THE INVENTION

Due to the increasing spread of electric vehicles and the associated spread of charging stations, the electrical load on the electrical energy supply networks will increase. With an increasing load in the supply networks, however, the risk of network under-supply also increases. In the case of such under-supply, the electrical load is greater than the supply provided by the power stations (generators). In such a case, the load difference can only be covered from the kinetic energy of the rotating masses of the generators. This necessarily leads, however, to an under-frequency in the supply network, wherein the actual network frequency deviates from the reference value for the network.

Known measures for securing electricity supply consist of the detection of under-frequency and the use of under-frequency relays in transformer substations. If a frequency deviation of 1 Hz is detected, i.e. a frequency of 49 Hz in the network, then an immediate load shedding of 10 to 15% of the network load is put into effect by the opening of the under-frequency relays. This occurs regularly by load shedding at the high-voltage level by disconnecting the 110/10 Kv transformers. Load shedding in the medium-voltage transformers is also possible, however.

With the use of under-frequency relays, the entire transformer is separated from the network. This is increasingly problematic, because nowadays not only are consuming components connected to a transformer, but also generators. Due to the widespread use of wind generators and solar power systems, the situation may arise in some areas of the low-voltage, medium-voltage, and/or high-voltage sectors that, when a load shedding is desired, in fact a shedding of generation capacity also takes place. This, however, leads to network stabilisation not taking place. Instead, such a load shedding remains without effect. Intelligent solutions for load shedding are therefore necessary.

Against the background of the increasing load incurred by electric vehicles, the subject-matter was based on the object of providing charging stations with network stabilisation.

SUMMARY OF THE INVENTION

This object is achieved according to the subject-matter by a charging station for electric vehicles which comprises a network frequency measuring device arranged to acquire a network frequency and to detect a deviation in the network frequency from a reference frequency, and a load regulating device in operational connection with the network frequency device, such that, upon a deviation from the reference frequency being detected in the network frequency, the load regulating device regulates the electrical power emitted to an electric vehicle by the charging station.

This object is also achieved according to the subject-matter by a method for operating a charging station for electric vehicles, which comprises the acquisition of a network frequency, the detection of a deviation in the network frequency from a reference frequency, and the regulation of electrical power emitted to an electric vehicle by the charging station upon a deviation from the reference frequency being detected in the network frequency.

Regulating in the meaning of the subject-matter can be a regulation as, for example, a reduction or an increase, as is described hereinafter. Regulating in the meaning of the subject-matter can mean a step-by-step change (increase or reduction) of the load. In this context, the charging current can be altered step-by-step. A change in the charging current can be effected by the electric vehicles in that their charging regulators can allow lower or higher charging currents. With regulating in the meaning of the subject-matter, a load regulator of an electric vehicle can be controlled by the load regulating device, and the load regulator can regulate the charging load, e.g. the charging current, in accordance with the control (sign inversion, reduction, increase). The load regulating device can monitor whether the vehicle changes the charging power in accordance with the control, and, where there is non-conformance, can detach the load regulator and, respectively, also the vehicle, from the network. Regulating can also mean that an amount of power is fed into the network by the vehicle (sign inversion of the charging current).

It has been recognised that electric vehicle charging stations in particular are well-suited for network stabilisation, since on the one hand powerful electrical energy consumers (loads) are connected to these charging stations, and, on the other (in future), a powerful in-feed can be carried out. It has also been recognised that the electrical energy consumers connected to the charging stations allow for a variable power consumption or output. In particular when charging times for electric vehicles last for a plurality of hours, it is possible that changes may occur in the charging current during charging, without adverse effect to the complete charging of the vehicle battery to the end of the charge time.

Thanks to the use of a network frequency measuring device in the charging stations, it is possible to detect a change in a network frequency, such as a collapse. According to the subject-matter, this takes place in a decentralised manner, since a network frequency measuring device can be installed in many charging stations, or indeed every station. It is also conceivable that such a device is only provided in specific charging stations, for example, every fifth, every tenth, or every hundredth charging station.

The network reference frequency in Europe is regularly 50 Hz, and in the USA 60 Hz. Any deviation from this can be detected by means of the network frequency measuring device.

If a deviation is detected by the network frequency measuring device, this can activate the load regulating device, which is likewise arranged in the charging station. The load regulating device is arranged such that it can regulate the electrical power emitted to the electric vehicle. In this situation, in particular by means of the load regulating device, a regulating effect can be implemented in the vehicle itself This can take place by a request for the reduction in the current to the vehicle. It is possible to monitor whether the vehicle is respecting this request, and, if not, the vehicle can be detached from the network. Upon a reduction in the network frequency, then, with a load regulating device, the electrical power which is emitted to the electric vehicle can be reduced, or power can also be drawn from the electric vehicle. In this situation, the electric vehicle can be instructed, for example, to allow a lesser charging current, or to reverse the charging current, and to feed current back into the network. By this change in the electrical power which is emitted to/from the electric vehicle, the electrical load in the energy supply network is also reduced. If a large number of charging stations are equipped with a network frequency measuring device and a load regulating device, then a stabilisation of the energy supply network can be put into effect without a load shedding being necessary on the low-voltage, medium-voltage, and/or high-voltage levels. The reduction in the electrical power, which can also result in a total load shedding of the electric vehicle, also incurs a shed of electrical load exclusively, and not, as described in the prior art, likewise of electricity generators.

With a rise in network frequency it is also possible, for example, for the energy emitted from the charging station to the electric vehicle to be increased. In particular, the charging current can be increased. This can be achieved, for example, by the electric vehicle being informed that an increased charging current is available, and the electric vehicle or the charging regulator of the electric vehicle regulating the charging current upwards accordingly. The return feed can also be reduced.

According to an embodiment, it is proposed that, to regulate the electrical power emitted, the load regulating device communicates to reduce a charging power to the electric vehicle. In this situation, by negotiating new charge parameters, such as the charging current for example, the electric vehicle can be requested to draw a reduced present charging power. The charging regulator of the electric vehicle can then be adjusted such that, for example, it draws a lower amperage from the charging station, and so reduces the charging power.

It is also possible, according to an advantageous embodiment, for the load regulating device to impose a limit on a charging current to reduce the electrical power emitted.

According to an advantageous embodiment, it is proposed that the load regulating device reduces the electrical power emitted by the charging station along a reduction characteristic curve. In this case too, the vehicle is preferably informed accordingly in the event of the reduction. It has been recognised that, in particular with a decentralised network stabilisation, an abrupt reduction in the load, which would be incurred by a spontaneous load shedding by a large number of charging stations, would not contribute to the network stabilisation. Therefore, the reduction in the electrical power must take place gradually. This can be put into effect in accordance with a reduction characteristic curve. The reduction characteristic curve can enable a gradual load reduction in accordance with the change in the network frequency.

For this reason it is proposed that the reduction characteristic curve be dependent on the deviation amount detected by the network frequency measuring device, the duration of the deviation, and/or the frequency gradient. The greater the frequency deviation, the greater the reduction can be in the electrical power drawn off. The duration of the deviation, i.e. the period during which a frequency collapse is detected on the network, can also determine the amount of the reduction in electrical power emitted. In addition to this, the deviation gradient, i.e. the sharpness of the deviation of the frequency collapse, can be determinant for the reduction characteristic curve.

According to an advantageous embodiment, it is proposed that, upon an increase being detected in the network frequency, the load regulating device increases the electrical power emitted to an electric vehicle by the charging station. Accordingly, after the network has been stabilised and the network frequency approaches the reference frequency, the electrical power emitted can be gradually increased. This can take place along an increase characteristic curve. It is also possible, upon the network frequency exceeding the reference value, for an increase in the electrical power to be advantageous, in order for the network frequency to approach the reference frequency once again.

According to an embodiment, the regulation of the electrical power emitted to the electric vehicle by the charging station consists of a reduction or an increase in the electrical power. This can be achieved by a reduction or increase in the current strength drawn by the electric vehicle.

According to an embodiment, in order to regulate the power emitted to the electric vehicle, regulating of the charging power is communicated to it. By this means, the charging station can request that the electric vehicle draw either a lower amperage or a higher amperage. In particular, a reduction in the current power being drawn is advantageous for network stabilisation.

According to an embodiment, it is also proposed that the reduction in the emitted electrical power is dependent on a reduction characteristic curve. The reduction characteristic curve can advantageously be dependent on the detected deviation amount of the frequency, the duration of the deviation of the frequency, and/or the frequency gradient.

The methods referred to heretofore can also be put into effect as a computer program or as a computer program stored on a memory medium. In this situation, on the charging station side a microprocessor can be appropriately programmed by a computer program to carry out the individual steps of the method.

The features of the methods and devices can be freely combined with one another. In particular, features of the dependent claims can be inventive in their own, circumventing the features of the independent claims, standing alone or freely combined with one another.

BRIEF DESCRIPTION OF THE DRAWINGS

The subject-matter is explained in greater detail hereinafter on the basis of drawings showing exemplary embodiments. The drawings show.

DETAILED DESCRIPTION OF THE INVENTION

Figure 1:
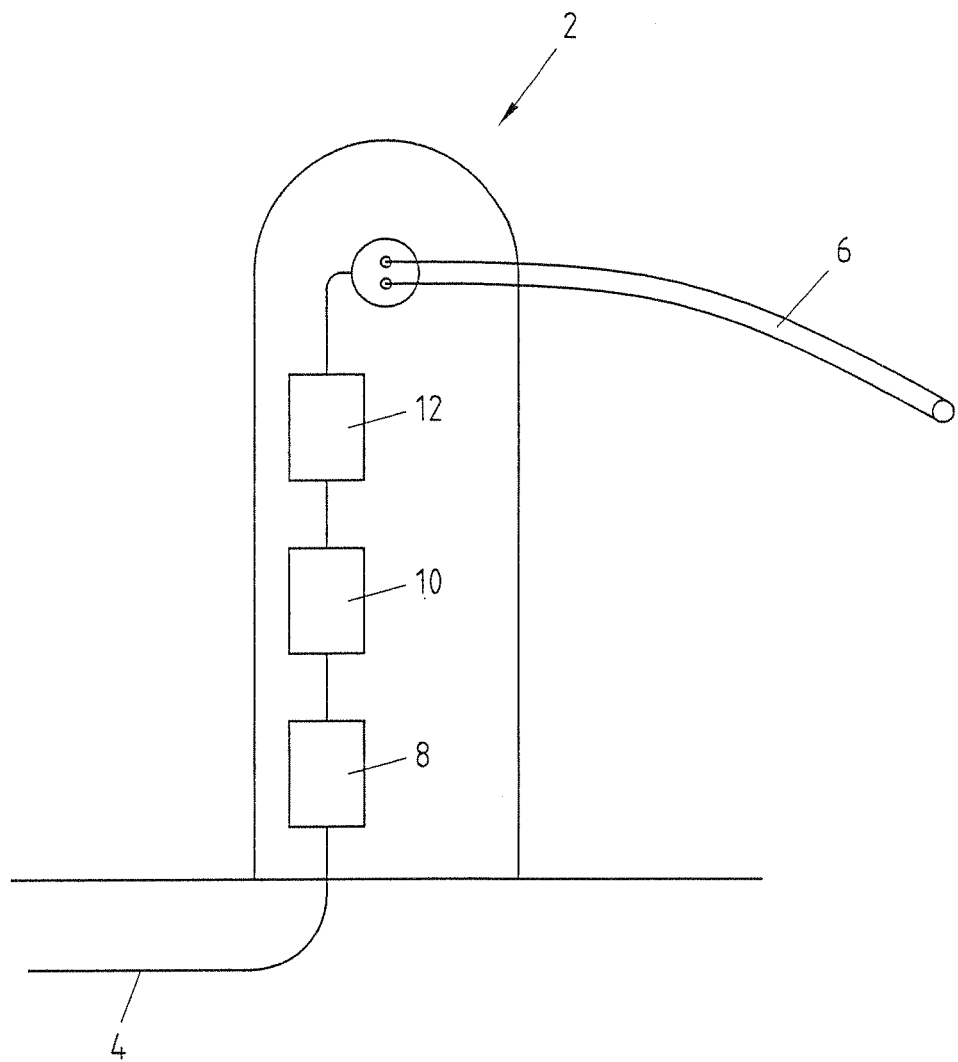
FIG. 1 a diagrammatic structure of a charging station according to an exemplary embodiment.
Figure 2:
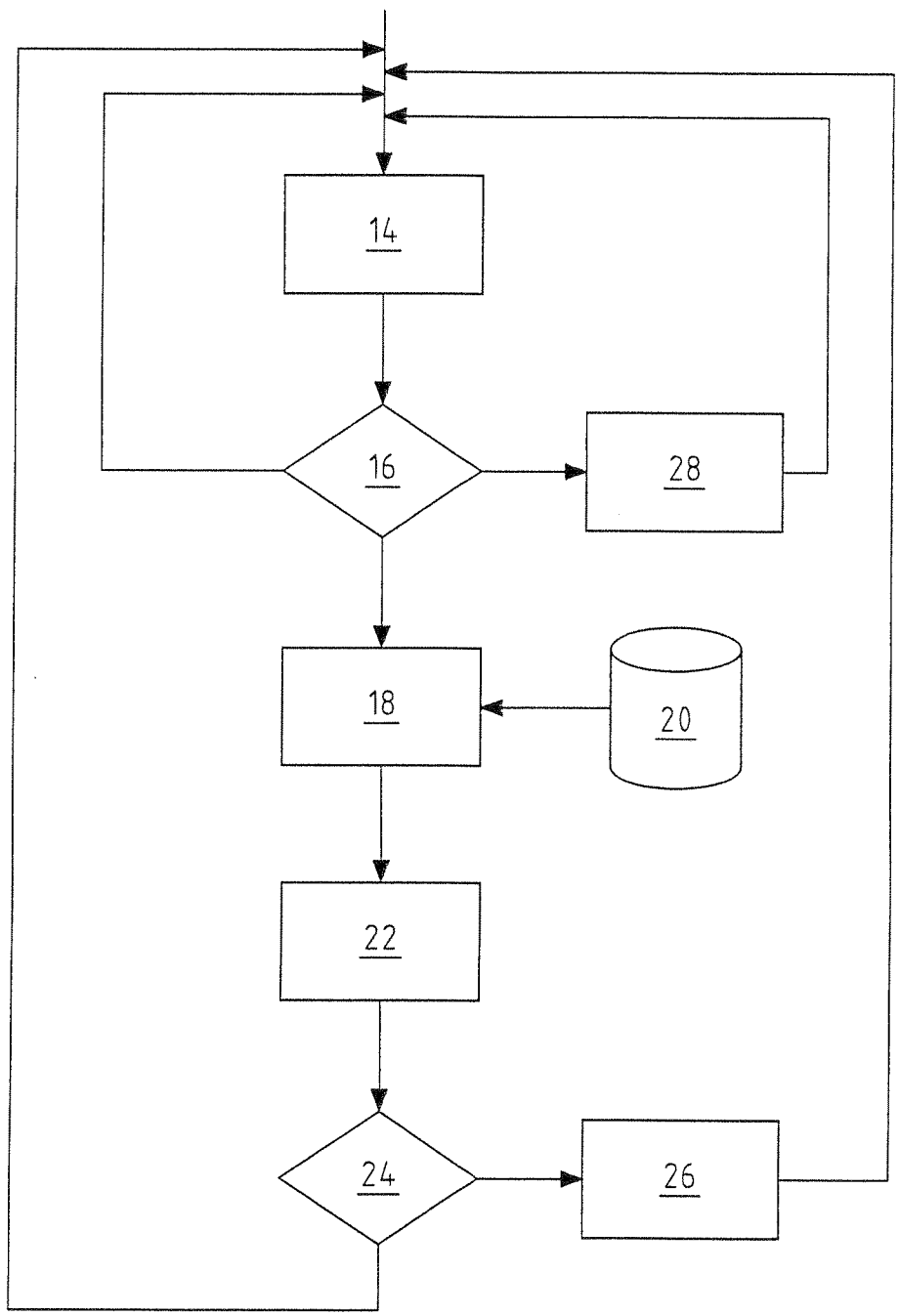
FIG. 2 a sequence of a method according to an exemplary embodiment.

FIG. 1 shows a charging station 2 for charging electric vehicles (not shown). The charging station 2 is connected by means of an energy cable 4 to an electrical energy supply network. The charging station 2 draws electrical power via the energy cable 4. The electrical power is provided to the electric vehicle by means of a charging cable 6. In the charging station 2, which in the present case is represented in purely diagrammatic form, is a network frequency measuring device 8. In addition to this, a load regulating device 10 and a load control circuit 12 are located in the charging station 2. The network frequency measuring device 8 is in operational connection with the load regulating device 10 such that, depending on the network frequency measured by the network frequency measuring device 8, the load regulating device 10 can control the load control circuit 12 in order to regulate the electrical power emitted to the electric vehicle via the charging cable 6. In this situation, the vehicle can be instructed to reduce the load, and the vehicle is then monitored for conformity with this instruction. The charging station 2 operates, for example, in accordance with the method shown in FIG. 2.

First, the network frequency measuring device 8 measures 14 the network frequency at the energy cable 4. The network frequency measured is compared 16 with a reference frequency. In this context, by way of example, for Europe a reference frequency is assumed of 50 Hz. If the network frequency concurs with the reference frequency, then the method reverts back to step 14. If the network frequency deviates, for example, by more than 0.2 Hz, or more than 0.5 Hz, from the reference frequency, then the load regulating device 10 is activated 18. The load regulating device 10 determines, on the basis of the frequency deviation, a reduction characteristic curve from a database 20. In this situation, the load regulating device 10 can take account, for example, of the frequency shift, the frequency gradient, and/or the duration of the frequency deviation.

Figure 3A:
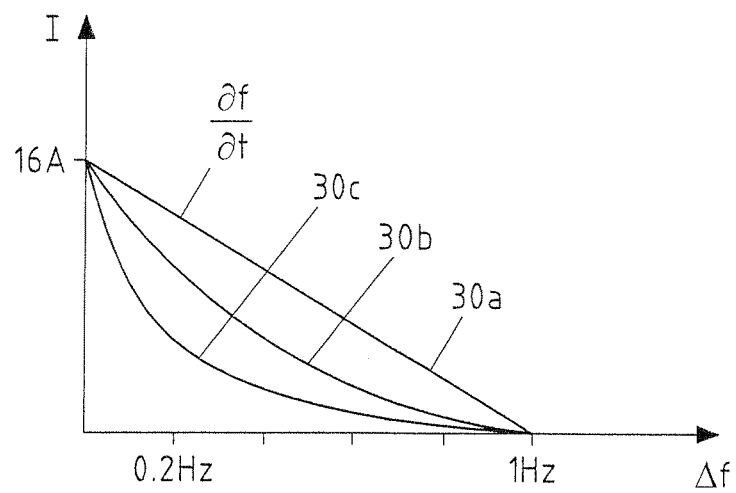
FIG. 3a a first exemplary reduction characteristic curve section.

FIG. 3a shows, by way of example, a first array of reduction characteristic curves 30. It can be seen that, for example, a charging current of 16 A is reduced as a function of the deviation in the network frequency ($\Delta f$). Shown in FIG. 3a are three curves 30a, 30b, 30c, which can be selected, for example, as a function of the frequency gradient ($\partial f/\partial t$). For example, a first characteristic curve 30a can be selected at a frequency gradient of 0.1 Hz/s. If the frequency gradient is 0.2 Hz/s, then, for example, the reduction characteristic curve 30b can be selected, and if the frequency gradient is 0.4 Hz/s, then the reduction characteristic curve 30c can be selected. It can be seen that as the frequency gradient rises, a more rapid reduction in the charging current is already achieved at small frequency deviations. Accordingly, the load regulating device 10 in step 18 can select a reduction characteristic curve 30a-c as a function of the frequency gradient, and regulate the charging current as a function of the absolute frequency deviation.

It is also possible for a reduction characteristic curve to be dependent on the duration of the frequency deviation. For example, in FIG. 3b an array of reduction characteristic curves 32 is shown, which on the one hand indicates the reduction in the charging current of 16 A as a function of the duration of a frequency deviation (T). A first reduction characteristic curve 32a can, for example, be selected with a frequency deviation ($\Delta f$) of 0.2 Hz. If the frequency deviation is 0.3 Hz, then a second reduction characteristic curve 32b can be selected. Here it can be seen that, with this reduction characteristic curve, even with a duration of the frequency deviation of about 50 s, a complete disconnection of the charging current takes place. A third reduction characteristic curve 32c can be selected, for example, at a frequency deviation of 0.4 Hz. With this characteristic curve, the complete disconnection already takes place more rapidly than 30 s.

Figure 3B:
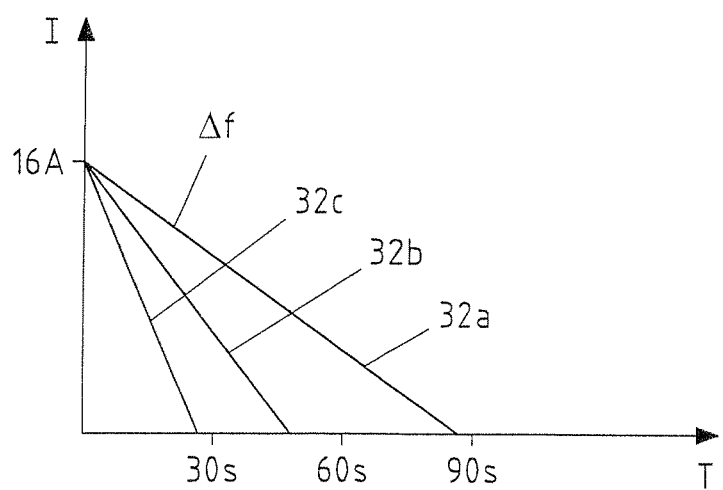
FIG. 3b a second exemplary reduction characteristic curve section.

It may be noted that all the numerical data in FIGS. 3a and 3b are purely by way of example, and are only intended to make it clear that the reduction characteristic curves can be selected as a function of various different factors.

Other characteristic curves are also conceivable, such as a characteristic curve depending on the frequency gradient and the duration.

Once the load regulating device 10 in step 18 has selected the reduction characteristic curve as a function of the frequency shift, the frequency gradient, and/or the duration of the reduction, then, by means of the reduction characteristic curve, the charge control circuit 12 can communicate 22 a reduction in the charging current to the electric vehicle via the charging cable. The electric vehicle is notified via the charging cable 6 that the maximum charging current must be reduced. The amount of the maximum charging current can be derived from the reduction characteristic curve.

Once it has been communicated 22 to the electric vehicle that the charging amperage must be reduced, in a step 24 the electric vehicle is monitored to ensure it does in fact reduce the charging current. If this is not the case, then in step 26 the electric vehicle is entirely separated from the charging station 2. The system then reverts back to step 14.

If the electric vehicle does behave in conformity with the regulation by the load control circuit 12, then likewise the system reverts back to step 14. In step 14, the network frequency is measured again, and in step 16 the network frequency is monitored in relation to the reference frequency, and appropriate steps are initiated.

If the network frequency drops further, or if the network frequency remains at a low level, then the system diverts to step 18.

If, by contrast, the network frequency rises, then the system diverts to step 28. In step 28 a rise characteristic curve can be selected, which has the effect of raising the charging amperage. As a result, in step 28 a reaction to a rise in the network frequency can be engendered, in which the reduction is reversed. As well as this, for example in step 28, it is also possible for the charging current also to be increased, as a function of a rise characteristic curve, at a network frequency which is above the reference frequency. The steps taken in step 28 correspond to those in steps 18 to 24, wherein the charging amperage is not reduced but raised, and therefore characteristic curves can be used with correspondingly inverted signs.

By means of the method according to the subject-matter, and the charging station according to the subject-matter, it is possible for a network stabilisation to be carried out in a decentralised manner. With the network stabilisation proposed, only loads are regulated, with the result that no network in-feed devices are affected by a load shedding.

The invention claimed is:

1. Charging station for electric vehicles, comprising:
a network frequency measuring device, arranged to acquire a network frequency and to detect a deviation in the network frequency from a reference frequency;
a load regulating device in operational connection with the network frequency measuring device such that, upon a deviation from the reference frequency being detected in the network frequency, the load regulating device regulates the electrical power emitted to an electric vehicle by the charging station;
wherein the load regulating device communicates a reduced charging power to the electric vehicle to reduce the electrical power emitted; and
wherein the load regulating device reduces the electrical power emitted by the charging station along a reduction characteristic curve, depending on at least one of the deviation amount detected by the network frequency measuring device, the duration of the deviation, and/or the frequency gradient.

2. Charging station of claim 1, wherein, upon a drop in the network frequency below the reference frequency, the load regulating device reduces the electrical power emitted to the electric vehicle by the charging station.

3. Charging station of claim 2, wherein, to reduce the electrical power emitted, the load regulating device imposes a limit on charging current.

4. Charging station of claim 1, wherein the reduction characteristic curve is depending on at least one of the deviation amount detected by the network frequency measuring device, the duration of the deviation, and/or the frequency gradient.

5. Charging station of claim 1, wherein, upon an increase being detected in the network frequency, the load regulating device increases the electrical power emitted to an electric vehicle by the charging station.

6. Method for operating a charging station for electric vehicles, comprising:
   acquisition of a network frequency;
   detection of a deviation in the network frequency from a reference frequency;
   regulation of electrical power emitted to an electric vehicle by the charging station upon a deviation from the reference frequency being detected in the network frequency;
   wherein a load regulating device communicates a reduced charging power to the electric vehicle to reduce the electrical power emitted;
   wherein the load regulating device reduces the electrical power emitted by the charging station along a reduction characteristic curve, depending on at least one of the deviation amount detected by a network frequency measuring device, the duration of the deviation, and/or the frequency gradient.

7. Method of claim 6, wherein the regulation of the electrical power emitted to the electric vehicle by the charging station is a reduction or increase.

8. Method of claim 6, wherein, upon a reduction in the charging power being communicated, the electric vehicle reduces a charging current.

9. Method of claim 6, wherein the reduction characteristic curve is determined as a function of at least one of the acquired deviation amount, the duration of the deviation, and/or the frequency gradient.

* * * * *